United States Patent
Jung

(10) Patent No.: US 7,969,517 B2
(45) Date of Patent: Jun. 28, 2011

(54) ELECTRICALLY-DRIVEN LIQUID CRYSTAL LENS AND STEREOSCOPIC DISPLAY DEVICE USING THE SAME

(75) Inventor: Sung Min Jung, Incheon-si (KR)

(73) Assignee: LG. Display Co. Ltd., Seoul (KR)

( * ) Notice: Subject to any disclaimer, the term of this patent is extended or adjusted under 35 U.S.C. 154(b) by 245 days.

(21) Appl. No.: 12/261,830

(22) Filed: Oct. 30, 2008

(65) Prior Publication Data
US 2009/0153754 A1 Jun. 18, 2009

(30) Foreign Application Priority Data

Dec. 18, 2007 (KR) ........................ 10-2007-0133484

(51) Int. Cl.
*G02F 1/1335* (2006.01)
*G02F 1/1337* (2006.01)
(52) U.S. Cl. ........................... 349/15; 349/123; 349/200
(58) Field of Classification Search .................... 349/15, 349/200
See application file for complete search history.

(56) References Cited

U.S. PATENT DOCUMENTS

| | | | |
|---|---|---|---|
| 7,697,109 B2 * | 4/2010 | Yun et al. | 349/200 |
| 2009/0015737 A1 * | 1/2009 | Jung et al. | 349/15 |
| 2009/0122210 A1 * | 5/2009 | Im | 349/15 |
| 2009/0153653 A1 * | 6/2009 | Lee et al. | 348/59 |
| 2010/0007807 A1 * | 1/2010 | Galstian et al. | 349/23 |
| 2010/0157181 A1 * | 6/2010 | Takahashi | 349/33 |

* cited by examiner

*Primary Examiner* — Sarah Hahm
(74) *Attorney, Agent, or Firm* — Brinks Hofer Gilson & Lione

(57) ABSTRACT

An electrically-driven liquid crystal lens wherein an electrode is defined with a vertical or horizontal rubbing direction, achieving an improved lens profile effect, and a stereoscopic display device using the same are disclosed. The liquid crystal lens includes first and second substrates arranged opposite each other and each including a plurality of lens regions, a plurality of first electrodes formed on the first substrate to correspond to the respective lens regions while being spaced apart from one another, to which voltages gradually increasing from the center to the edge of each lens region are applied, a second electrode formed over the entire surface of the second substrate, a first alignment film formed over the entire surface of the first substrate including the first electrodes and having an alignment direction parallel to or perpendicular to a longitudinal direction of the first electrodes, a second alignment film formed on the second electrode and having an anti-parallel alignment direction relative to the first alignment film, and a liquid crystal layer filled between the first substrate and the second substrate.

13 Claims, 17 Drawing Sheets

⊙ : POLARIZING DIRECTION

ELECTRICALLY-DRIVEN LIQUID CRYSTAL LENS AND STEREOSCOPIC DISPLAY DEVICE USING THE SAME

This application claims the benefit of the Korean Patent Application No. P2007-133484, filed on, Dec. 18, 2007, which is hereby incorporated by reference as if fully set forth herein.

BACKGROUND OF THE INVENTION

1. Field of the Invention

The present invention relates to an electrically-driven liquid crystal lens, and more particularly, to an electrically-driven liquid crystal lens wherein electrodes are defined with a vertical or horizontal rubbing direction, achieving improved lens-profile effects, and a stereoscopic display device using the same.

2. Discussion of the Related Art

At present, services for rapid dissemination of information, based on high-speed information communication networks, have developed from a simple "listening and speaking" service, such as current telephones, to a "watching and listening" multimedia type service based on digital terminals used for high-speed processing of characters, voice and images, and are expected to be ultimately developed into cyberspace 3-dimensional stereoscopic information communication services enabling virtual reality and stereoscopic viewing free from the restrains of time and space.

In general, stereoscopic images representing 3-dimensions are realized based on the principle of stereo-vision via the viewer's eyes. However, since the viewer's eyes are spaced apart from each other by about 65 mm, i.e. have a binocular parallax, the left and right eyes perceive slightly different images due to a positional difference therebetween. Such a difference between images due to the positional difference of the eyes is called binocular disparity. A 3-dimensional stereoscopic image display device is designed on the basis of binocular disparity, allowing the left eye to view only an image for the left eye and the right eye to view only an image for the right eye.

Specifically, the left and right eyes view different two-dimensional images, respectively. If the two different images are transmitted to the brain through the retina, the brain accurately fuses the images, giving the impression of a real 3-dimensional image. This ability is conventionally called stereography.

Technologies for displaying the above-described 3-dimensional stereoscopic images may be classified into a stereoscopic display type, volumetric measurement type, and hologram type. Of these types, the stereoscopic display type may be classified into two types, one using 3D glasses and the other not using glasses. In turn, the type not using glasses may be classified, based on the shape of a structure used for 3D realization, into a parallax barrier type and a lenticular type. A discussion of lenticular type stereoscopic displays follows.

Hereinafter, a conventional lenticular type stereoscopic liquid crystal display device will be described with reference to the drawings.

FIG. 1 is a perspective view illustrating a conventional lenticular type stereoscopic liquid crystal display device, and FIG. 2 is a sectional view illustrating the stereoscopic liquid crystal display device of FIG. 1.

As shown in FIG. 1, the conventional lenticular type stereoscopic liquid crystal display device includes a liquid crystal panel 10 consisting of upper and lower substrates 10a and 10b with liquid crystals 10c filled therebetween, a backlight unit 20 located at a back surface of the liquid crystal panel 10 and serving to direct light toward the liquid crystal panel 10, and a lenticular plate 30 located at a front surface of the liquid crystal panel 10 and serving to realize stereoscopic images.

As shown in FIG. 2, first and second polarizers 11 and 12 are attached to an upper surface of the upper substrate 10a and a lower surface of the lower substrate 10b, respectively.

The lenticular plate 30 is fabricated by forming a material layer, having a convex-lens-shaped upper surface, on a flat substrate.

When images, having passed through the liquid crystal panel 10, exit the lenticular plate 30, the viewer's eyes perceive different groups of images, thereby perceiving 3-dimensional stereoscopic images.

In the above-described conventional stereoscopic liquid crystal display device, the lenticular plate 30 and liquid crystal panel 10 are supported by structures (not shown) and thus, the first polarizer 11 on the liquid crystal panel 10 is spaced apart from the lenticular plate 30 by a predetermined distance.

With this configuration, however, the liquid crystal panel 10 or the lenticular plate 30 may droop or bend into a space between the first polarizer 11 on the liquid crystal panel 10 and the lenticular plate 30. This bending phenomenon results in abnormal optical pathways through the backlight unit 20, liquid crystal panel 10 and lenticular plate 30, thereby deteriorating image quality.

To reduce the space between the liquid crystal panel 10 and the lenticular plate 30, inserting an adhesive between the liquid crystal panel 10 and the lenticular plate 30 to attach the liquid crystal panel 10 and lenticular plate 30 to each other might be considered. However, the greater the area of the liquid crystal panel 10, the greater the required amount of the adhesive. Moreover, the adhesive problematically causes deterioration in transmissivity.

The above-described conventional stereoscopic display device has the following problems.

With relation to attachment of the above-described lenticular lens, there are problems, such as the use of an adhesive, deterioration in visual sensitivity due to the bending phenomenon causes, or a difficulty in the processing of a smooth lenticular lens.

SUMMARY

An electrically-driven liquid crystal lens comprises: first and second substrates arranged opposite each other and each including a plurality of lens regions; a plurality of first electrodes formed on the first substrate to correspond to the respective lens regions while being spaced apart from one another, to which voltages gradually increasing from the center to the edge of each lens region are applied; a second electrode formed over the entire surface of the second substrate; a first alignment film formed over the entire surface of the first substrate including the first electrodes and having an alignment direction parallel to or perpendicular to a longitudinal direction of the first electrodes; a second alignment film formed on the second electrode and having an anti-parallel alignment direction relative to the first alignment film; and a liquid crystal layer filled between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to an electrically-driven liquid crystal lens and a stereoscopic display device using the same according to the preferred embodiments of the present invention, examples of which are illustrated in the accompanying drawings. Wherever possible, the same reference numbers will be used throughout the drawings to refer to the same or like parts.

Recently, an electrically-driven liquid crystal lens has been proposed, in which a liquid crystal layer serves as a lens by use of characteristics of liquid crystal molecules.

Specifically, a lens is adapted to control pathways of incident light on a per position basis by use of a difference in the index of refraction between constituent materials of the lens and the ambient air. In lieu of adopting such a physical lens, in the case of the electrically-driven liquid crystal lens, when different voltages are applied to different positions of a liquid crystal layer to drive the liquid crystal layer by different electric fields at the different positions, light incident on the liquid crystal layer undergoes a phase variation on a per position basis. As a result, the liquid crystal layer can control pathways of incident light like an actual lens. When the liquid crystals, which are driven to transmit light, like a lens, by an electric field, constitute an array together with electrodes used to drive the liquid crystals, the array is referred to as an electrically-driven liquid crystal lens.

Hereinafter, an electrically-driven liquid crystal lens and a stereoscopic display device using the same will be described in detail with reference to the accompanying drawings.

Figure 1:
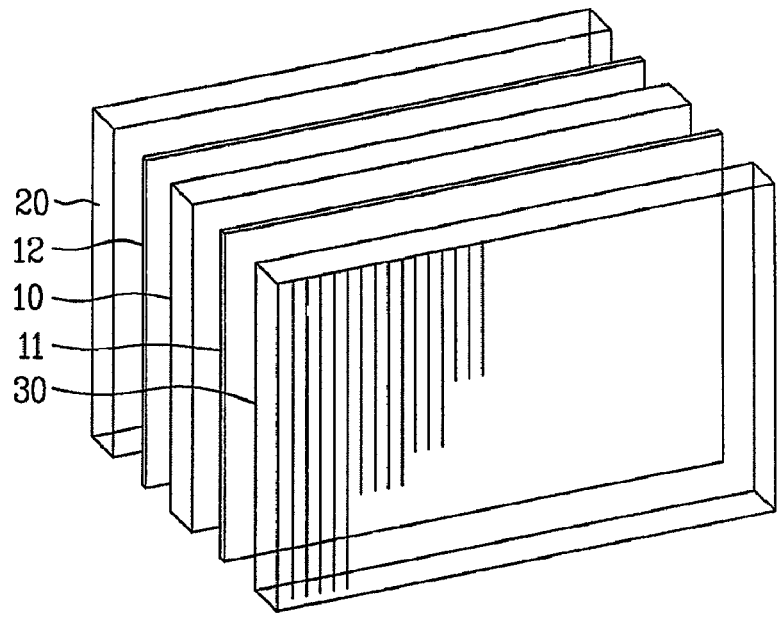
FIG. 1 is a perspective view illustrating a conventional lenticular lens type stereoscopic display device.
Figure 2:
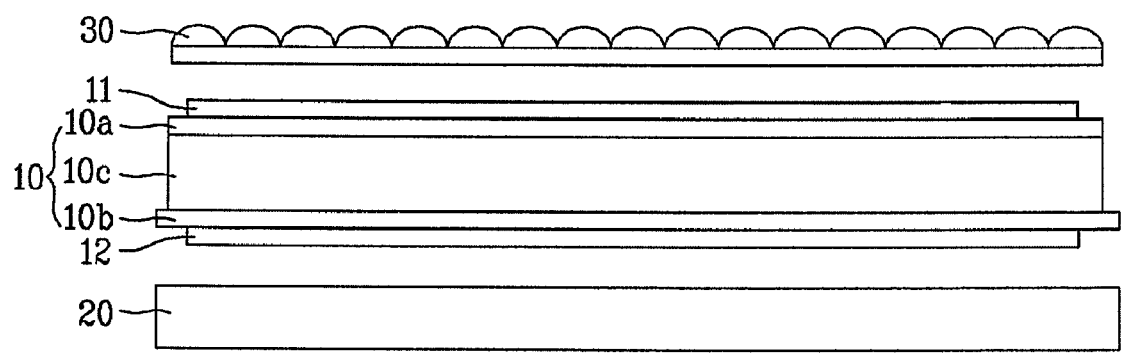
FIG. 2 is a sectional view of FIG. 1.
Figure 3A:
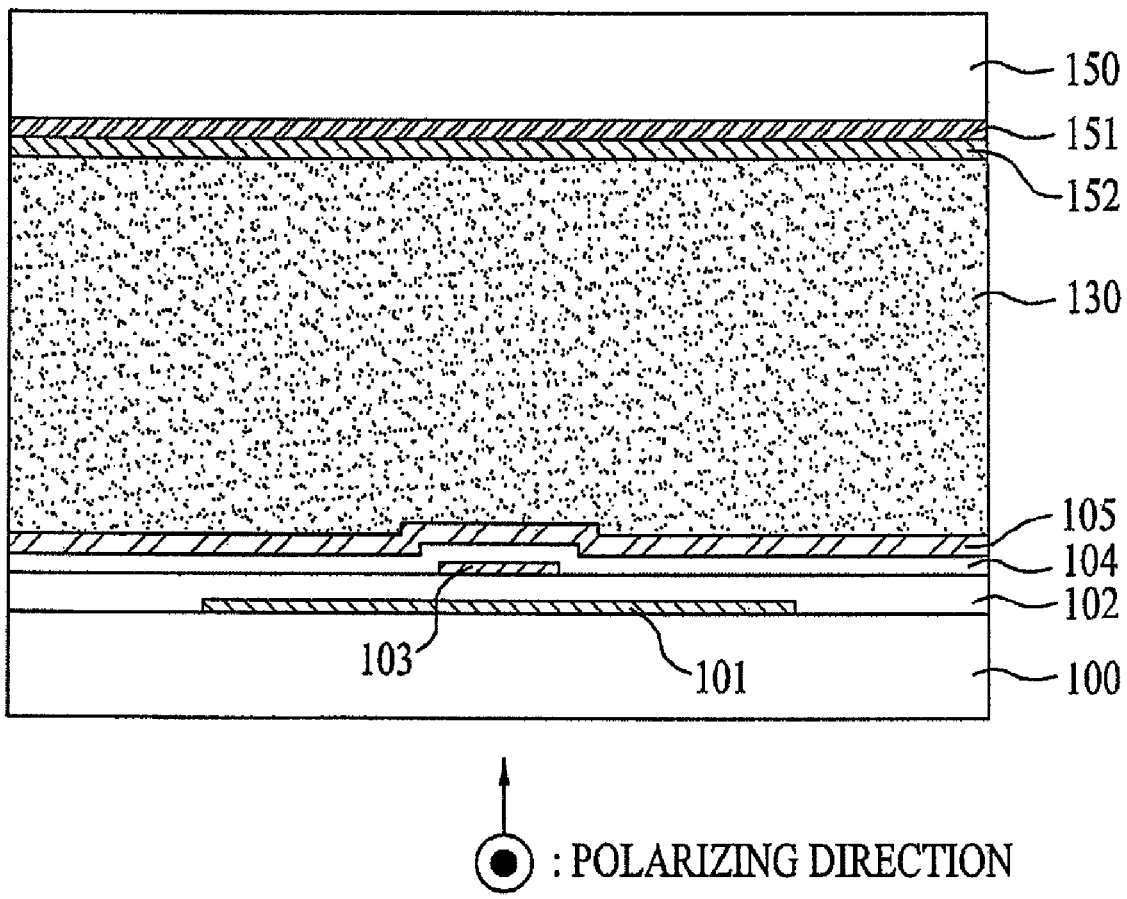
FIGS. 3A to 3C are views, respectively, illustrating polarizing direction, electric field shape, and alignment of liquid crystals before and after application of voltages when a 3-electrode type electrically-driven liquid crystal lens has a rubbing direction into the drawing.
Figure 3B:
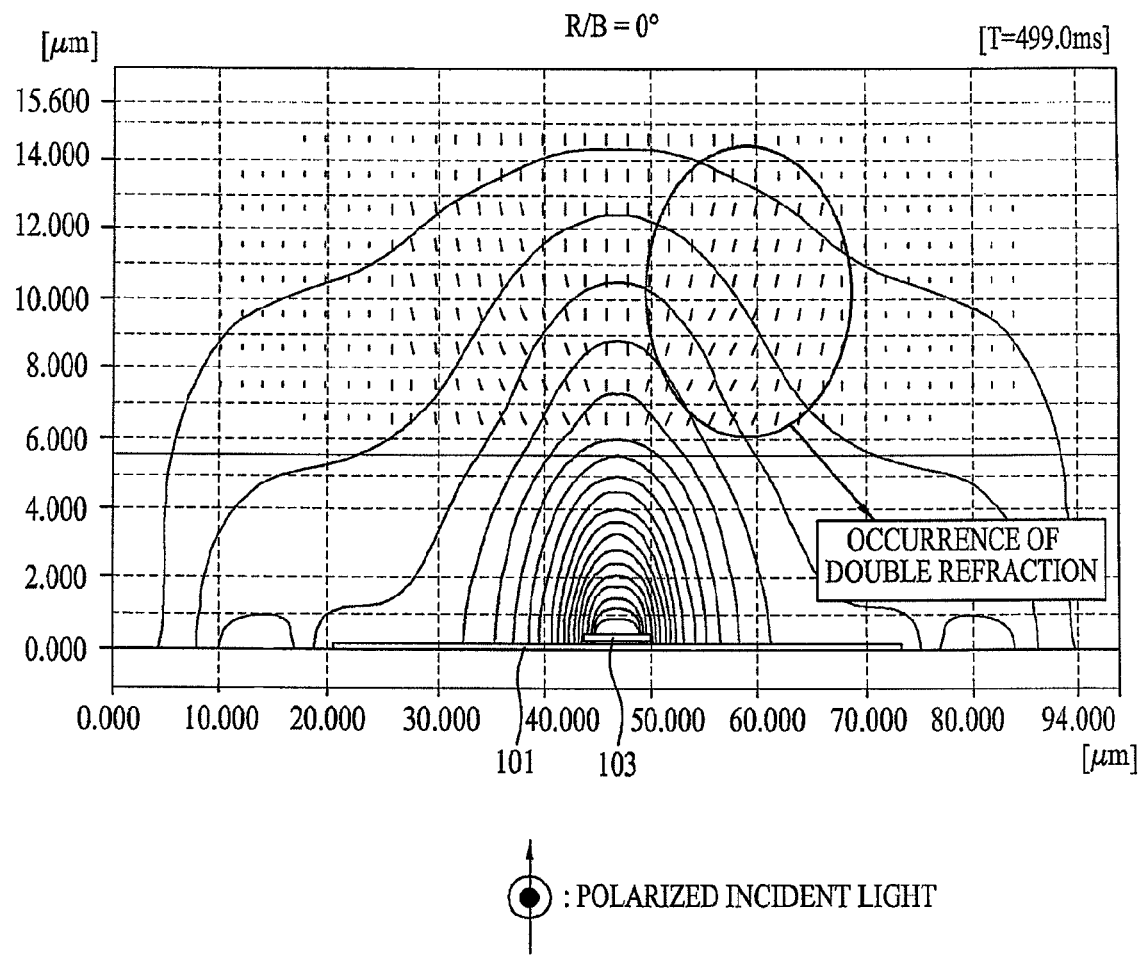
Figure 3C:
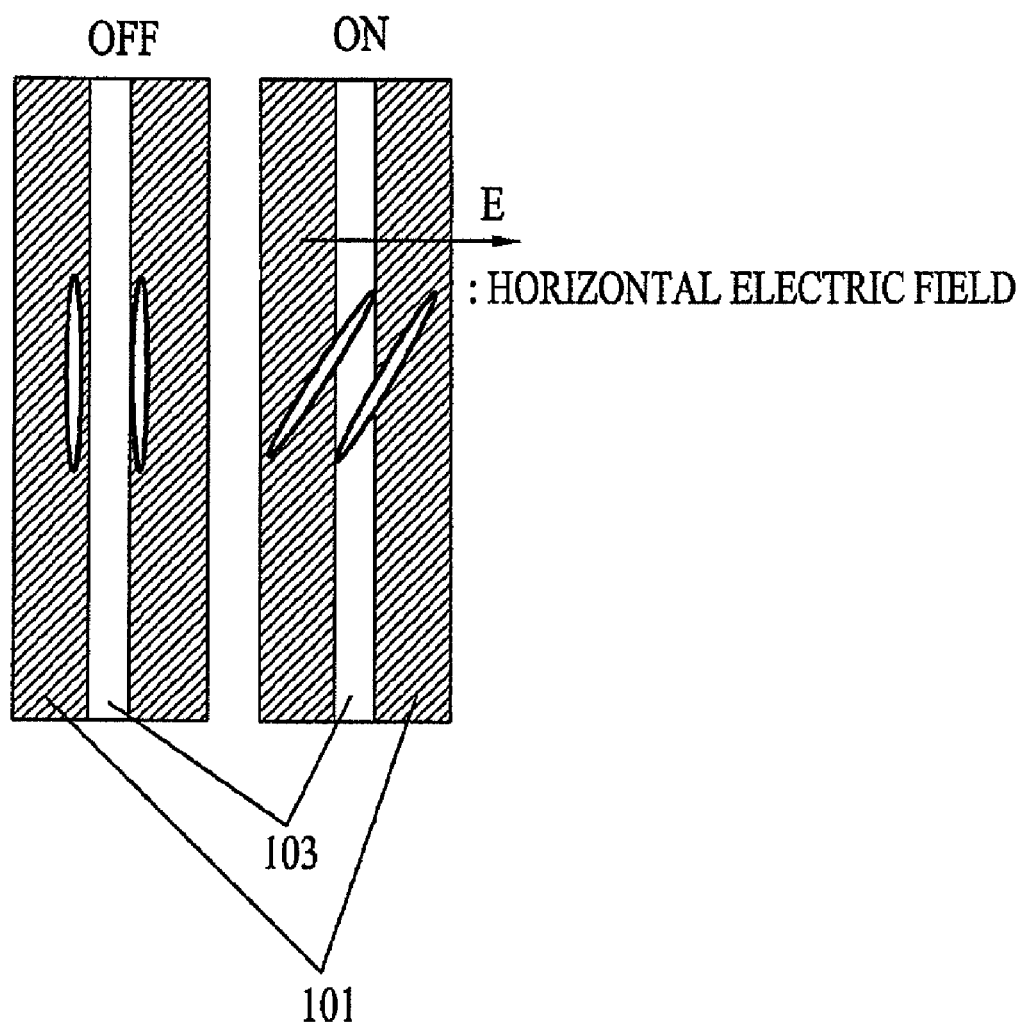

FIGS. 3A to 3C are views, respectively, illustrating polarizing direction, electric field shape, and alignment of liquid crystals before and after application of voltages, when a 3-electrode type electrically-driven liquid crystal lens has a rubbing direction into the drawing.

As shown in FIG. 3A, the 3-electrode type electrically-driven liquid crystal lens is configured as follows.

The electrically-driven liquid crystal lens includes first and second substrates 100 and 150 arranged opposite each other and each having a plurality of lens regions L, and a liquid crystal layer 130 filled between the first substrate 100 and the second substrate 150. Here, the plurality of lens regions L of the first and second substrates 100 and 150 correspond to each other.

Each lens region L is defined to have a width equal to a pitch P, and the plurality of lens regions L with the same pitch are periodically repeated in a given direction (in a horizontal direction in FIG. 3). Here, "pitch P" means a horizontal width of the lens region L. It is noted that the lens region L does not have a physical convex-lens shape, but functions as a lens via alignment of liquid crystals under the influence of an electric field.

First electrodes 101 having a first width are formed on the first substrate 100 at and around the edges of the respective neighboring lens regions L. A first insulating film 102 is formed over the first substrate 100 including the first electrodes 101, and second electrodes 103 are formed on the first insulating film 102. The second electrodes 103 have a smaller width than that of the first electrodes 101 and are located right above the respective first electrodes 101. A second insulating film 104 is formed over the entire surface of the first insulating film 102, to cover the second electrodes 103, and a first alignment film 105 is formed over the entire surface of the second insulating film 104.

A third electrode 151 is formed over the entire surface of the second substrate 150, and a second alignment film 152 is formed on the third electrode 151.

To enable display of 2-dimensional images when no voltage is applied, the first and second substrates 100 and 150 are subject to aligning treatment so as to transmit light in an initial state (when no voltage is applied). Specifically, to provide the liquid crystal layer 130 with light transmitting alignment characteristics in the initial state when no voltage is applied, the first alignment film 105 is subjected to rubbing in a longitudinal direction of the second electrodes 103, and the second alignment film 152 is subjected to rubbing in an anti-parallel direction. Here, the anti-parallel direction means that the rubbing direction of the second alignment film 152 is parallel to that of the first alignment film 105, but the rubbing of the second alignment film 152 advances opposite to that of the first alignment film 105. Since no polarizers are provided at back surfaces of the first and second substrates 100 and 150, light from a display panel therebelow directly passes through the electrically-driven liquid crystal lens to thereby be directed to a viewer. This is called an Electrically Controlled Birefringence (ECB) mode.

FIG. 3A shown in sectional view illustrates a zone between the centers of the neighboring left and right lens regions L, which has a width equal to a pitch P. If a high-voltage and threshold voltage are applied to the second electrode 103 and first electrode 101, respectively, and a ground voltage is applied to the opposite third electrode 151, as shown in FIG. 3B, a resulting vertical electric field is strongest at the second electrode 103 and gradually decreases with increasing distance from the second electrode 103. It can be appreciated from FIG. 3B illustrating the electric field that electric potential planes are steep at the second electrode 103, but become gentle with increasing distance from the second electrode 103. Liquid crystal molecules of the liquid crystal layer 130 have positive dielectric constant anisotropy and thus, are aligned in an electric field direction (perpendicular to electric potential planes). Accordingly, it can be appreciated that the liquid crystal molecules are upright at the second electrode 103, but are gradually tilted horizontally away from the second electrode 103 to thereby be completely horizontally aligned at the farthest position of the second electrode 103 (i.e. at the center of the lens region L). That is, alignment of liquid crystals by an electric field causes a difference in the index of refraction, whereby the resulting electrically-driven liquid crystal lens exhibits half-parabolic phase-characteristics in the lens region L about the center of the second electrode 103. If the same pattern as the description is repeated in a given direction (in a horizontal direction), parabolic planes of the electrically-driven liquid crystal lens are periodically formed in series at the intervals of the pitch.

In this case, a horizontal electric field is generated between the second electrode 103 and the first electrode 101 due to a difference in voltages applied to the electrodes 103 and 101. The horizontal electric field causes rotation of liquid crystals between the first and second electrodes 101 and 103, resulting in double refraction.

As shown in FIG. 3C, assuming that the first alignment film 105 on the first substrate 100 is aligned in the longitudinal direction of the second electrode 103, liquid crystals are aligned in the longitudinal direction of the second electrode 103 in an initial voltage-OFF state before voltages are applied to liquid crystals. On the other hand, in a voltage-ON state after application of voltages, the liquid crystals are rotated and obliquely tilted by a horizontal electric field E generated due to a voltage difference between the second electrode 103 and the first electrode 101 as well as the vertical electric field between the second electrode 103 and the third electrode 151. The rotation of liquid crystals results in double refraction near the outer edge of the second electrode 103.

In this case, light, directed from the lower side of the electrically-driven liquid crystal lens, has a polarizing direction into the drawing consistent with the longitudinal direction of the second electrodes 103, and advances to pass through the electrically-driven liquid crystal lens.

The threshold voltage applied to the first electrodes 101 is an AC square wave voltage having a peak value represented by $$V = \pi \sqrt{\frac{K1}{\Delta\varepsilon\varepsilon 0}}$$

(where, $\Delta\epsilon$ is a liquid crystal dielectric constant anisotropy, K1 is the splay elastic modulus, and $\epsilon_0$ is a free-space dielectric constant). The high voltage applied to the second electrodes 103 is an AC square wave voltage having a peak value of about 2.5V to 10V.

Although not shown, seal patterns (not shown) are formed at outer peripheral regions of the first and second substrates 100 and 150, to support the first and second substrates 100 and 150. The liquid crystal layer 130 between the first and second substrates 100 and 150 has a sufficient thickness equal to about 15~30 µm, in order to form a sufficient phase of the electrically-driven liquid crystal lens. To stably maintain the thickness of the liquid crystal layer 130, ball spacers or column spacers can be further provided to support a cell gap between the first and second substrates 100 and 150. In this case, it is desirable to position the spacers so as not to distort the phase of the electrically-driven liquid crystal lens.

The electrically-driven liquid crystal lens of the present invention serves as a lens for use in realization of 3-dimensional images, and as occasion demands, may be provided in a 2-dimensional image display device and be used to convert 2-dimensional images into 3-dimensional images to thereby emit the 3-dimensional images. In addition, on the basis of characteristics of directly transmitting light upon application of no voltage, the electrically-driven liquid crystal lens can serve as a switching device to display 2-dimensional images when no voltage is applied thereto, or 3-dimensional images when voltages are applied thereto. The electrically-driven liquid crystal lens can be used along with a display panel, which is located below the electrically-driven liquid crystal lens and serves to display 2-dimensional images. In brief, the electrically-driven liquid crystal lens, having a switching function to selectively display 2-dimensional images or 3-dimensional images, can display stereoscopic (3-dimensional) images by converting 2-dimensional images from the display panel therebelow when voltages are applied thereto, and also, can directly pass the 2-dimensional images from the display panel to the viewer when no voltage is applied thereto so as to realize 2-dimensional images.

Figure 4A:
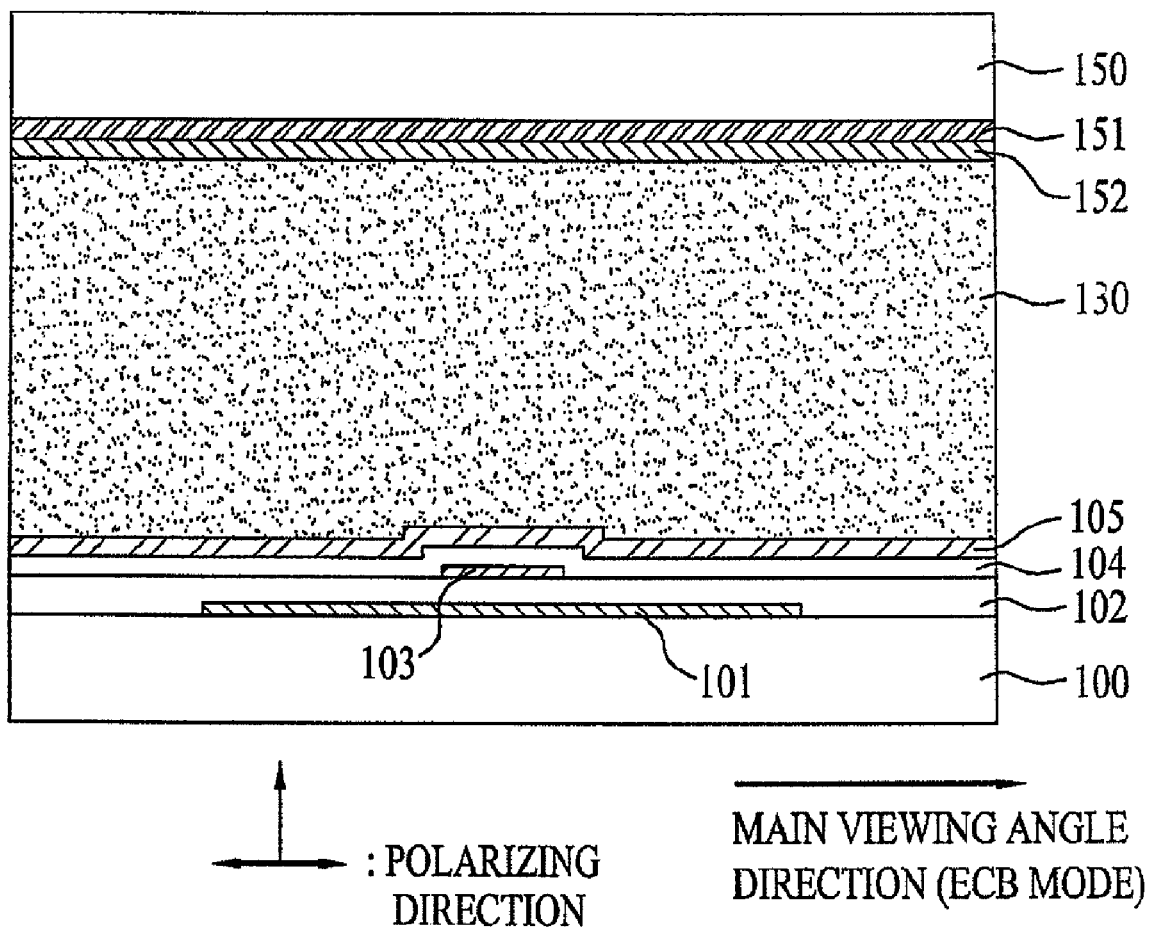
FIGS. 4A to 4C are views, respectively, illustrating polarizing direction, electric field shape, and alignment of liquid crystals before and after application of voltages when a 3-electrode type electrically-driven liquid crystal lens has a horizontal rubbing direction.
Figure 4B:
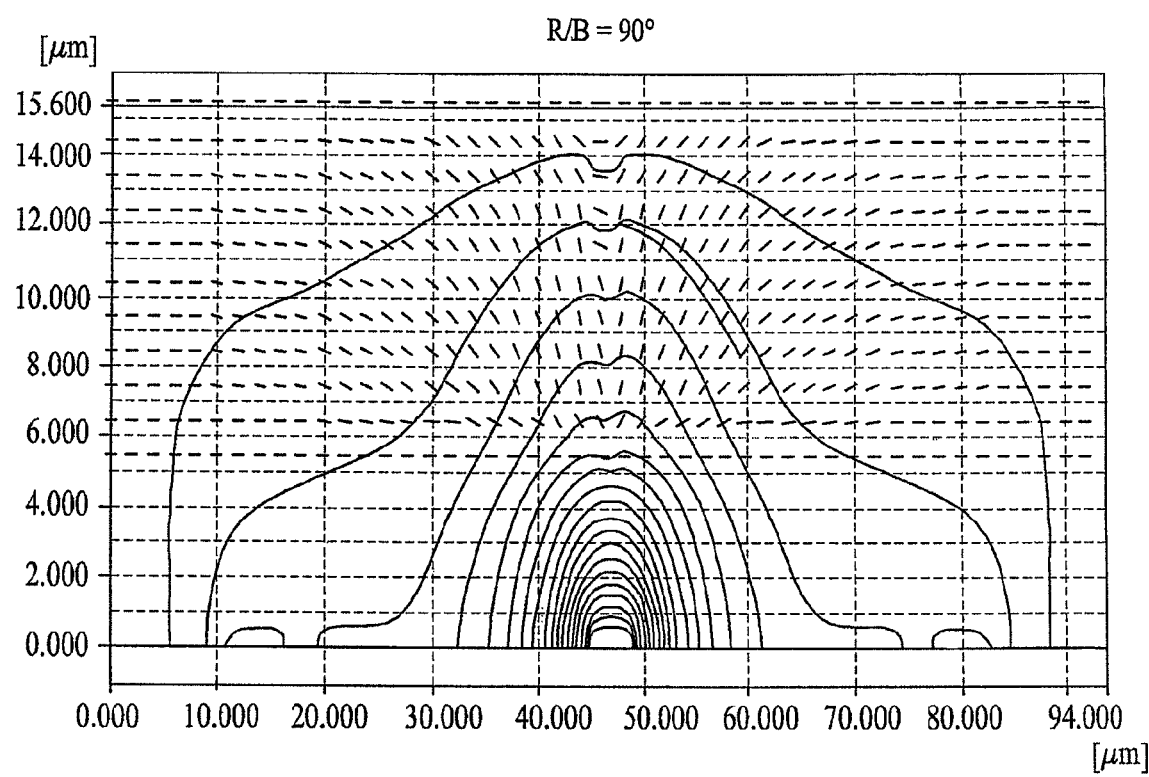
Figure 4C:
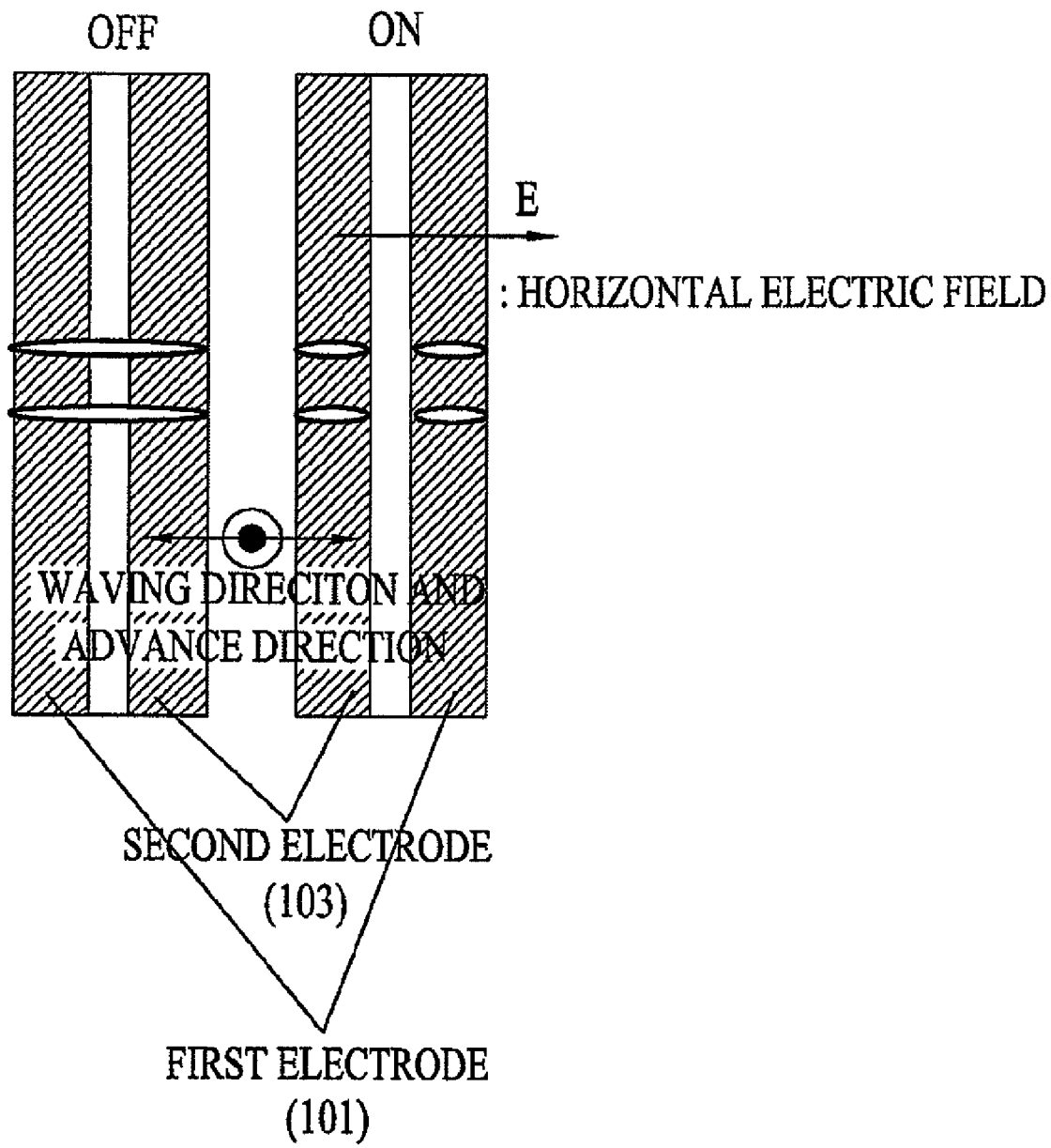

FIGS. 4A to 4C are views, respectively, illustrating polarizing direction, electric field shape, and alignment of liquid crystals before and after application of voltages when a 3-electrode type electrically-driven liquid crystal lens has a horizontal rubbing direction.

As described above, when the first alignment film 105 is subjected to rubbing in the longitudinal direction of the second electrode 103, upon application of voltages, liquid crystals may be tilted from the longitudinal direction of the second electrode 103 by a slight horizontal electric field between the first and second electrodes 101 and 103. To solve this problem, as shown in FIG. 4A, it is desirable that the rubbing direction of the first alignment film 105 be perpendicular to the longitudinal direction of the second electrode 103. That is, the rubbing direction of the first alignment film 105 is consistent with the horizontal electric field between the first and second electrodes 101 and 103. In this case, light from the lower side of the electrically-driven liquid crystal lens is directed in a horizontal direction of FIG. 4A consistent with the rubbing direction of the first alignment film 105. The second alignment film 152 is subjected to rubbing in an anti-parallel direction. That is, the rubbing direction of the second alignment film 152 is parallel to the rubbing direction of the first alignment film 105 and the rubbing of the second alignment film 152 advances opposite to the rubbing of the first alignment film 105.

As shown in FIG. 4C, liquid crystals are aligned in the rubbing direction of the first alignment film 105 perpendicular to the second electrode 103 in a voltage-OFF state. Then, as shown in FIGS. 4B and 4C, in a voltage-ON state, even if a horizontal electric field is generated between the first and second electrodes 101 and 103, liquid crystals are already aligned horizontally (perpendicular to the second electrode 103) and are free from rotation due to the horizontal electric field. That is, the liquid crystals are upright by a strong vertical electric field between the third electrode 151 on the second substrate 150 and the first and second electrodes 101 and 103. In this case, as shown in FIG. 4B, liquid crystal molecules have the greatest uprightness at the second electrode 103 and the uprightness gradually decreases with increasing distance from the second electrode 103. Comparing the voltage-OFF state with the voltage-On state, the liquid crystal molecules are changed only in alignment direction from the horizontal direction to the vertical direction, and have no change in alignment plane, achieving a reduced distorted area and more uniform electric field as compared to the previously described configuration (as shown in FIGS. 3A to 3C).

However, even in the horizontal alignment of FIGS. 4A to 4C, the electrically-driven liquid crystal lens may represent asymmetric configuration due to a tilt angle with relation to the rubbing of the first and second alignment films 105 and 152. For example, even if the tilt angle is less than about 1°, it can be observed that the electrically-driven liquid crystal lens after application of voltages (representing a difference in optical pathways in the liquid crystal layer) is tilted, rather than being accurately horizontally symmetrical about the center of the lens region L.

Accordingly, efforts to solve the above-described problems have been submitted.

Figure 5:
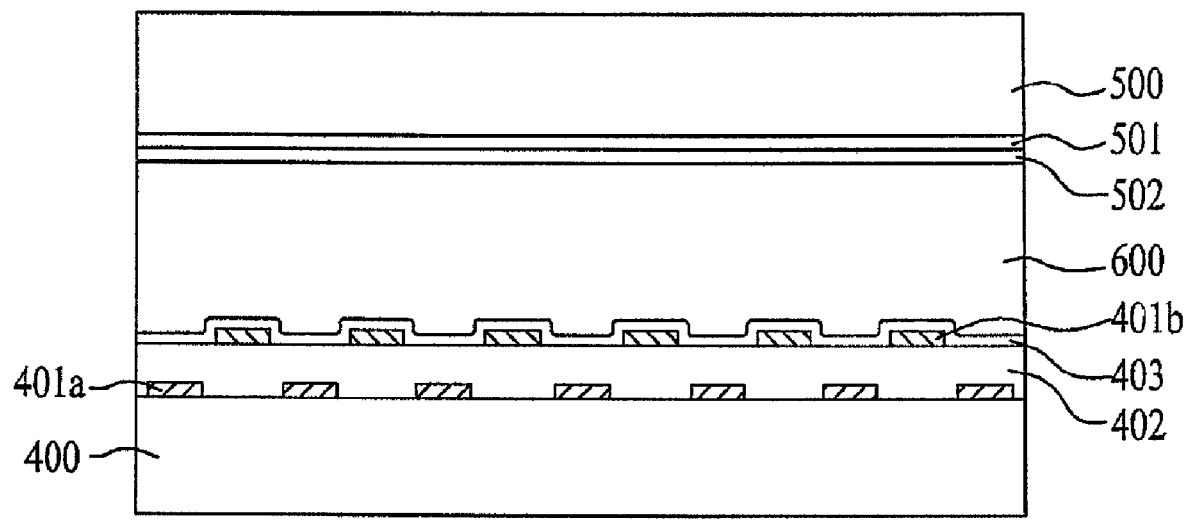
FIG. 5 is a sectional view illustrating an electrically-driven liquid crystal lens according to an embodiment of the present invention.
Figure 6:
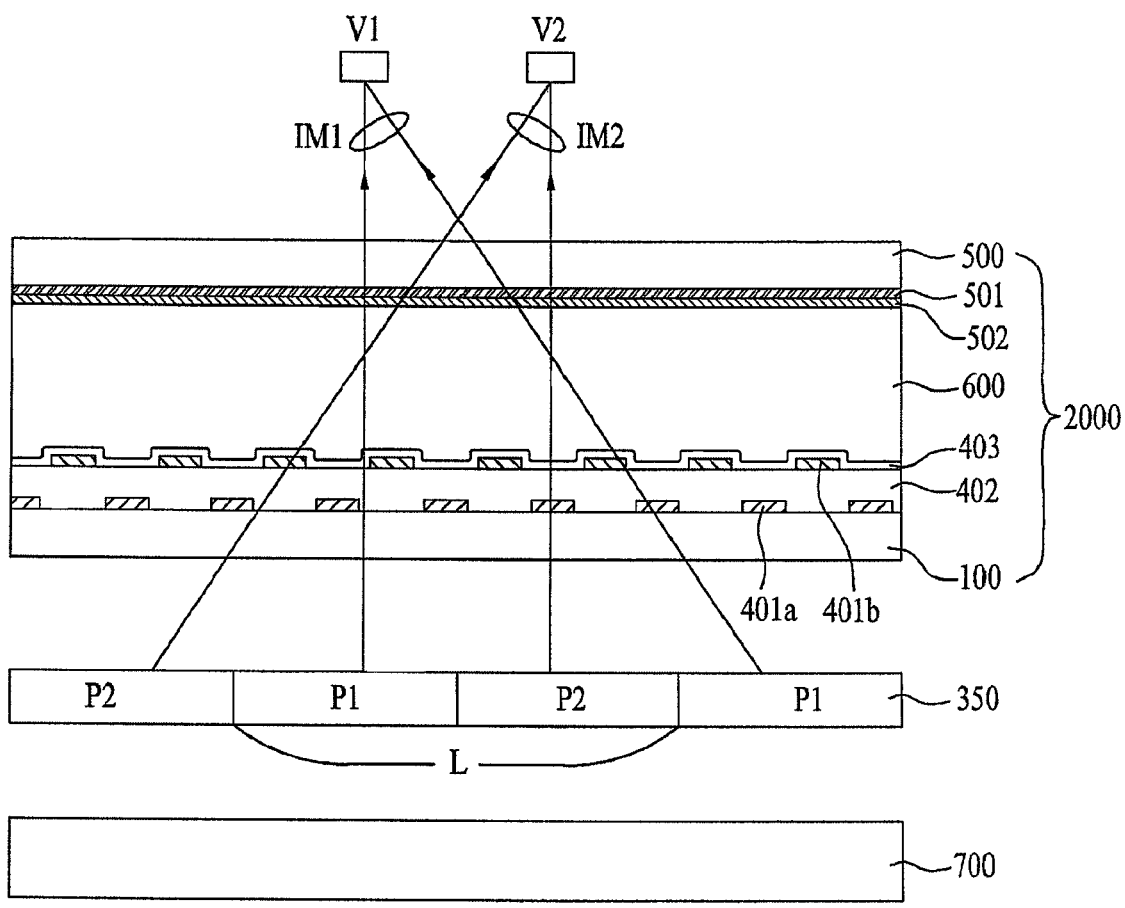
FIG. 6 is a sectional view illustrating a stereoscopic display device including the electrically-driven liquid crystal lens of FIG. 5.

FIG. 5 is a sectional view illustrating an electrically-driven liquid crystal lens according to the present invention, and FIG. 6 is a sectional view illustrating a stereoscopic display device including the electrically-driven liquid crystal lens of FIG. 5.

As shown in FIGS. 5 and 6, the stereoscopic display device according to the present invention includes an electrically-driven liquid crystal lens 2000, which is driven upon receiving voltages to thereby function as a lens, a display panel 350, which is disposed below the electrically-driven liquid crystal lens 2000 and serves to emit 2-dimensional image information, and a light source 700, which is disposed below the display panel 350 and serves to direct light to the display panel 350.

As occasion demands, if the display panel 350 is a self-illuminating device, omission of the light source 700 is possible.

The display panel 350 contains first and second image pixels P1 and P2 alternately and repeatedly arranged to display first and second images IM1 and IM2, respectively. The display panel 350 can be selected from various flat-panel displays including a Liquid Crystal Display (LCD), Organic Light Emitting Display (OLED), Plasma Display Panel (PDP), Field Emission Display (FED), etc. The display panel 350 is located below the electrically-driven liquid crystal lens 2000, and serves to transmit 2-dimensional image signals to the electrically-driven liquid crystal lens 2000.

The electrically-driven liquid crystal lens 2000 of the present invention functions, similar to a lens-profile, to convert 2-dimensional image signals into 3-dimensional image signals to thereby emit the 3-dimensional image signals. The electrically-driven liquid crystal lens 2000 is located above the display panel 350 realizing 2-dimensional images, and functions to selectively emit 3-dimensional image signals or to directly emit 2-dimensional image signals without conversion, according to whether or not voltages are applied thereto. Specifically, on the basis of direct transmission of light when no voltage is applied thereto, the electrically-driven liquid crystal lens 2000 can serve as a switching device to display 2-dimensional images when no voltage is applied thereto and display 3-dimensional images when voltages are applied thereto.

Hereinafter, the electrically-driven liquid crystal lens 2000 will be described in more detail.

As shown in FIG. 5, the electrically-driven liquid crystal lens 2000 of the present invention includes first and second substrates 400 and 500 arranged opposite each other and each defining a plurality of lens regions L to correspond to those of the other substrate, a plurality of first electrodes 401a and 401b arranged on the first substrate 400 with the same interval with respect to the respective lens regions L, a second electrode 501 formed on the entire surface of the second substrate 500, voltage signal sources Vmin, V1, V2, . . . Vmax to apply different voltages to the respective first electrodes 401a and 401b, and a liquid crystal layer 600 filled between the first substrate 400 and the second substrate 500.

The electrically-driven liquid crystal lens 2000 contains periodically repeated lens regions L having different optical pathways. In FIG. 6, the lens regions L are repeated horizontally, and the first electrodes 401a and 401b have an elongated bar form extending into the drawing.

The first electrodes 401a and 401b may be spaced apart from one another by the same interval, or as occasion demands, may have a variable interval gradually increasing or decreasing from the edge E to the center O of the lens region.

Here, the first electrodes 401 and 401b and second electrode 501 are made of transparent metals, preventing loss of transmissivity at locations thereof.

Although the first electrodes may be arranged in a single layer with a given interval, the first electrodes may be divided and arranged into different layers. For example, as shown, the first electrodes 401a may be formed on the first substrate 400 and the first electrodes 401b may be formed on an insulating film 402. In this case, the first electrodes 401a or 401b in the same layer can be arranged with an increased interval suitable to prevent short-circuit when it is desired to closely arrange the first electrodes. Furthermore, from the viewpoint of the plane, all the first electrodes 401a and 401b can be densely arranged to cover substantially the entire surface of the first substrate 400.

With respect to each lens region L, a first voltage Vmin, which is equal to an approximate threshold voltage, is applied to the first electrode located at the center O of the lens region L, whereas the highest $n^{th}$ voltage Vmax is applied to the first electrode located at the edge E of the lens region L. In this case, voltages applied to the first electrodes 401a and 401b, located between the center O and the edge E of the lens region L, range from the threshold voltage Vmin to the $n^{th}$ voltage Vmax of the lens region L, and gradually increase with increasing distance from the center O of the lens region L. When voltages are applied to the plurality of first electrodes 401a and 401b, a ground voltage is applied to the second electrode 501, generating a vertical electric field between the first electrodes 401a and 401b and the second electrode 501.

Upon application of voltages, it is desirable that a difference in voltages applied to the neighboring first electrodes 401a and 401b be less than about 1V, so as not to generate an excessively great horizontal electric field between the first electrodes 401a and 401b.

The plurality of first electrodes 401a and 401b are horizontally symmetrically formed about the edge E of the lens region L. The respective first electrodes 401a and 401b are connected to the corresponding voltage signal sources Vmin, V1, V2, . . . Vmax via metal wirings (not shown) in a pad region (i.e. non-display region of the display panel 350), such that corresponding voltages are applied to the first electrodes 401a and 401b.

Here, the lowest threshold voltage Vmin applied to the first electrode 401a or 401b located at the center O of the lens region L is an AC square wave voltage having a peak value of about 1.4V to 2V, and the threshold voltage Vmin is given by $$V = \pi \sqrt{\frac{K1}{\Delta\varepsilon\varepsilon 0}}$$

(where, $\Delta\varepsilon$ is a liquid crystal dielectric constant anisotropy, K1 is the modulus of elasticity of liquid crystals, and $\varepsilon_0$ is a free-space dielectric constant). The highest voltage applied to the first electrode 401a or 401b located at the edge E of the lens region L is an AC square wave voltage having a peak value of about 2.5V to 10V.

When voltages, ranging from the above-described threshold voltage (i.e. AC square wave voltage having a peak value of 1.4V to 2V) to the highest voltage (i.e. AC square wave voltage having a peak value of 2.5V to 10V), are applied to the plurality of first electrodes 401a and 401b provided in the electrically-driven liquid crystal lens 2000 and a ground voltage is applied to the second electrode 501, the electrically-driven liquid crystal lens 2000 functions similar to an optical parabolic lens, transmitting the first and second images IM1 and IM2 emitted from the display panel 350 to first and second viewing zones V1 and V2, respectively. If a distance between the first viewing zone V1 and the second viewing zone V2 is set to a distance between the viewer's eyes, the viewer can combine the first and second images IM1 and IM2 transmitted to the first and second viewing zones V1 and V2, perceiving 3-dimensional images based on binocular disparity.

On the other hand, when no voltage is applied to the first electrodes 401a and 401b and second electrode 501, the electrically-driven liquid crystal lens 2000 simply serves as a transparent layer to directly display the first and second images IM1 and IM2 of the display panel 350 without refraction. Accordingly, the first and second images IM1 and IM2 are directly transmitted to the viewer through either viewing zone and thus, the viewer perceives 2-dimensional images.

In the drawing, one lens region L of the electrically-driven liquid crystal lens 2000 may correspond to a total width of two pixels P1 and P2 of the display panel 350 located below the electrically-driven liquid crystal lens 2000, and as occasion demands, may correspond to a plurality of pixels. In addition, the lens regions L may be tilted at a predetermined angle with respect to the pixels, and as occasion demands, may be arranged stepwise with respect to the pixels (the lens region of an $n^{th}$ pixel horizontal line may be shifted from an $(n+1)^{th}$ pixel horizontal line by a predetermined distance).

Each lens region L is defined to have a width equal to a pitch P, and the plurality of lens regions L with the same pitch are periodically repeated in a given direction (in a horizontal direction in FIG. 3). Here, "pitch P" means a horizontal width of the lens region L. It is noted that the lens region L does not have a physical convex-lens shape, but functions as a lens via alignment of liquid crystals under the influence of an electric field. The above-described lens regions L are obtained as the configuration of FIG. 5 is horizontally repeated at the intervals of the pitch.

In FIGS. 5 and 6, assuming that the width of the lens region L is equal to the pitch P, a distance between the center O and the edge E of the lens region L is equal to P/2. This means that symmetrical values of voltages are applied to the symmetrical first electrodes 401a and 401b from the edge E to the center O of the lens region L.

A first alignment film 403 and a second alignment film 502 are formed, respectively, on the first substrate 400 including the first electrodes 401a and 401b and on the second electrode 501. In this case, to allow the electrically-driven liquid crystal lens 2000 to function as a transparent layer in an initial state when no voltage is applied thereto, the first alignment film 403 may have the same rubbing direction as that of the first electrodes 401a and 401b, or may have a rubbing direction perpendicular to a longitudinal direction of the first electrodes 401a. In this case, the second alignment film 502 has a rubbing direction intersecting that of the first alignment film 403 or an anti-parallel rubbing direction. Thereby, the electrically-driven liquid crystal lens 2000 can directly pass images, transmitted from the display panel 350 located therebelow, to the viewer.

The plurality of first electrodes 401a and 401b have a bar shape extending along a crosswise direction of the first substrate 100 (along one side of the first substrate 400). Each of the first electrodes 401a and 401b has a width of 5 µm to 10 µm, and a distance between the neighboring first electrodes 401a and 401b is in a range from 5 µm to 10 µm. For example, the pitch P can be changed to various values ranging from 90 µm to 1,000 µm and, according to the above-described width and distance of the first electrodes 401a and 401b, approximately ten to one hundred or more first electrodes can be formed on a per lens region basis.

Although not shown, seal patterns (not shown) are formed at outer peripheral regions of the first and second substrates 400 and 500 (non-display regions including pad regions), to support the first and second substrates 400 and 500. The liquid crystal layer 600 between the first and second substrates 400 and 500 has a sufficient thickness equal to about 15 µm or more, in order to form a sufficient phase of the electrically-driven liquid crystal lens. To stably maintain the thickness of the liquid crystal layer 300, ball spacers or column spacers can be further provided to support a cell gap between the first and second substrates 400 and 500. In this case, it is advantageous to position the spacers so as not to distort the phase of the electrically-driven liquid crystal lens.

As the first electrodes 401a and 401b having the same width are arranged on the first substrate 400 and voltages gradually decreasing from the edge E to the center O of the lens region L are applied to the first electrodes 401a and 401b, a gentle vertical electric field is generated between the first electrodes 401a and 401b and the second electrode 501 and a slight horizontal electric field is generated between the neighboring first electrodes 401a and 401b. That is, a gentle horizontal electric field can be observed, in which the intensity is high at the edge E of the lens region L and is low at the center O of the lens region L.

Representing the length of optical pathways of liquid crystals aligned on a per position basis of an electric field, the edge E of the lens region L has the shortest optical pathway, and the center O of the lens region L has the longest optical pathway. Accordingly, it can be appreciated that the electrically-driven liquid crystal lens has a shape similar to a gentle parabolic lens.

Here, applying voltages to the first electrodes 401*a* and 401*b* and second electrode 501 changes an electric field, resulting in spatial refraction of light following a parabolic lens function.

Hereinafter, alignment shapes of liquid crystals before and after application of voltage will be described with reference to different embodiments of the electrically-driven liquid crystal lens according to the present invention, which are embodied according to alignment directions of the first and second alignment films 403 and 502 and optical properties of liquid crystals of the liquid crystal layer 600.

FIGS. 7A, 8A, 9A and 10A illustrate a single lens region L in sectional view, wherein the center of the drawing corresponds to the edge E of the lens region L and either left or right side of the drawing corresponds to the center O of the lens region L. When representing the shown lens region L as a lens profile based on a difference in optical pathways of the electrically-driven liquid crystal lens, parabolic lenses each cut in half are located at opposite sides of the edge E of the lens region L.

Here, the electrically-driven liquid crystal lens realized by the electric field of FIGS. 7A to 10A has an optical effect similar to that of a convex lens, in which the edge E of the lens region L has the smallest optical pathway difference and the center O of the lens region L has the greatest optical pathway difference. To obtain the same optical effect, FIGS. 7A and 8A propose increasing the intensity of the electric field toward the edge E, and FIGS. 9A and 10A propose increasing the intensity of the electric field toward the center O.

Figure 7A:
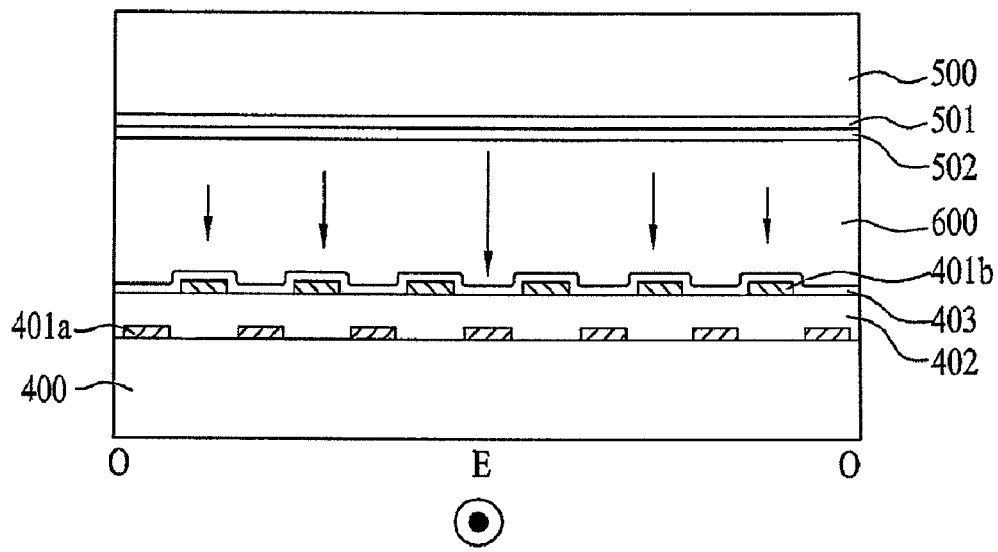
FIG. 7A is a sectional view illustrating an electrically-driven liquid crystal lens according to a first embodiment.
Figure 7B:
FIGS. 7B and 7C are views illustrating alignment shape of liquid crystals on a per distance basis in one lens region before and after application of voltages in the configuration of FIG. 7A.
Figure 7C:
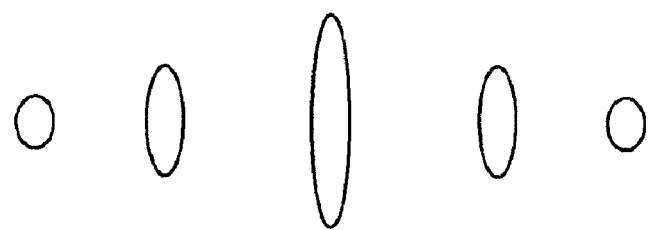

FIG. 7A is a sectional view illustrating an electrically-driven liquid crystal lens according to a first embodiment, and FIGS. 7B and 7C are views illustrating alignment shape of liquid crystals on a per distance basis in one lens region before and after application of voltages in the configuration of FIG. 7A.

As shown in FIG. 7A, in the electrically-driven liquid crystal lens according to a first embodiment of the present invention, the first and second alignment films 403 and 502 are aligned in the longitudinal direction of the first electrodes 401*a* and 401*b* on the first substrate 400 (in a direction into the drawing). In this case, the liquid crystals of the liquid crystal layer 600 have positive dielectric constant anisotropy. Each of the first and second alignment films 403 and 502 is a horizontal alignment film having a tilt angle of less than 1°, and the alignment direction thereof is defined via rubbing. The first and second alignment films 403 and 502 are subjected to rubbing in an anti-parallel direction to each other, on the basis of the longitudinal direction of the first electrodes 401*a* and 401*b*.

As shown in FIG. 7B, before application of voltages, the liquid crystals are aligned in the longitudinal direction of the first electrodes 401*a* and 401*b* consistent with the rubbing direction of the first alignment film 403. After application of voltages, as shown in FIG. 7C, the liquid crystals are driven by a vertical electric field between the first electrodes 401*a* and 401*b* and the second electrode 501, and the liquid crystals are upright at the edge E of the lens region L to which the strongest vertical electric field is applied, and are substantially horizontally aligned in an initial alignment direction at the center O of the lens region L. That is, the intensity of the vertical electric field gradually increases from the center O to the edge E, allowing the liquid crystals to become increasingly upright according to the intensity of the vertical electric field.

In FIG. 7A, the size of arrows represents the intensity of the vertical electric field. As shown, the edge E represents the strongest vertical electric field, and the intensity of the vertical electric field decreases toward the center O.

Figure 8A:
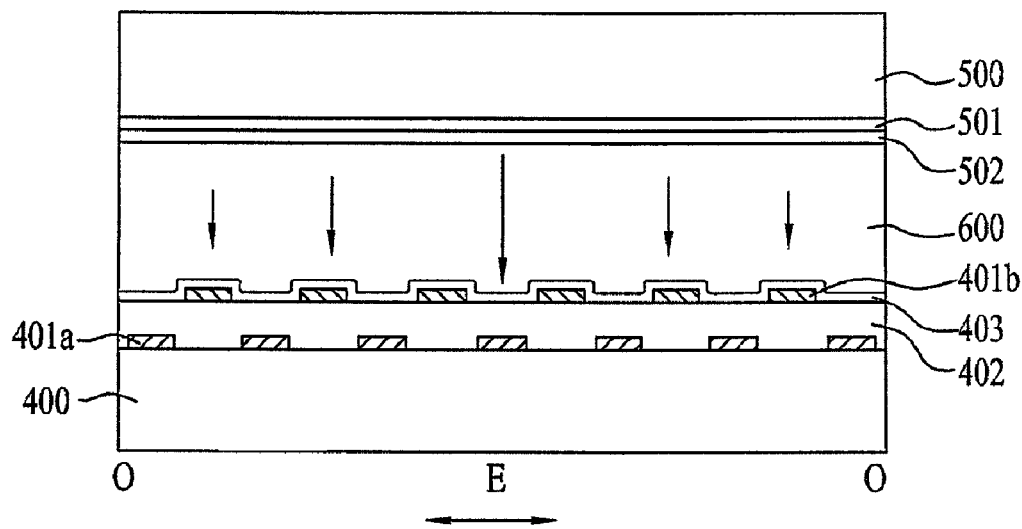
FIG. 8A is a sectional view illustrating an electrically-driven liquid crystal lens according to a second embodiment.
Figure 8B:
FIGS. 8B and 8C are views illustrating alignment shape of liquid crystals on a per distance basis in one lens region before and after application of voltages in the configuration of FIG. 8A.
Figure 8C:
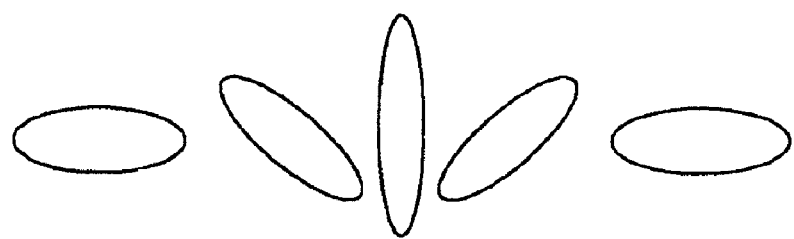

FIG. 8A is a sectional view illustrating an electrically-driven liquid crystal lens according to a second embodiment, and FIGS. 8B and 8C are views illustrating alignment shape of liquid crystals on a per distance basis in one lens region before and after application of voltages in the configuration of FIG. 8A.

As shown in FIG. 8A, in the electrically-driven liquid crystal lens according to a second embodiment of the present invention, the first and second alignment films 403 and 502 are aligned perpendicular to the longitudinal direction of the first electrodes 401*a* and 401*b* on the first substrate 400 (in a horizontal direction in the drawing). In this case, the liquid crystals of the liquid crystal layer 600 have positive dielectric constant anisotropy. Each of the first and second alignment films 403 and 502 is a horizontal alignment film having a tilt angle of less than 1°, and the alignment direction thereof is defined via rubbing. The first and second alignment films 403 and 502 are subjected to rubbing in an anti-parallel direction to each other, on the basis of a direction perpendicular to the longitudinal direction of the first electrodes 401*a* and 401*b*.

As shown in FIG. 8B, before application of voltages, the liquid crystals are aligned in a direction intersecting the first electrodes 401*a* and 401*b* consistent with the rubbing direction of the first alignment film 403. After application of voltages, as shown in FIG. 8C, the liquid crystals are driven by a vertical electric field between the first electrodes 401*a* and 401*b* and the second electrode 501, and the liquid crystals are upright at the edge E of the lens region L to which the strongest vertical electric field is applied, and are substantially horizontally aligned in an initial alignment direction at the center O of the lens region L. That is, the intensity of the vertical electric field gradually increases from the center O to the edge E, allowing the liquid crystals to become increasingly upright according to the intensity of the vertical electric field.

Similarly, in FIG. 8A, the size of arrows represents the intensity of the vertical electric field. As shown, the edge E represents the strongest vertical electric field, and the intensity of the vertical electric field decreases toward the center O.

Figure 9A:
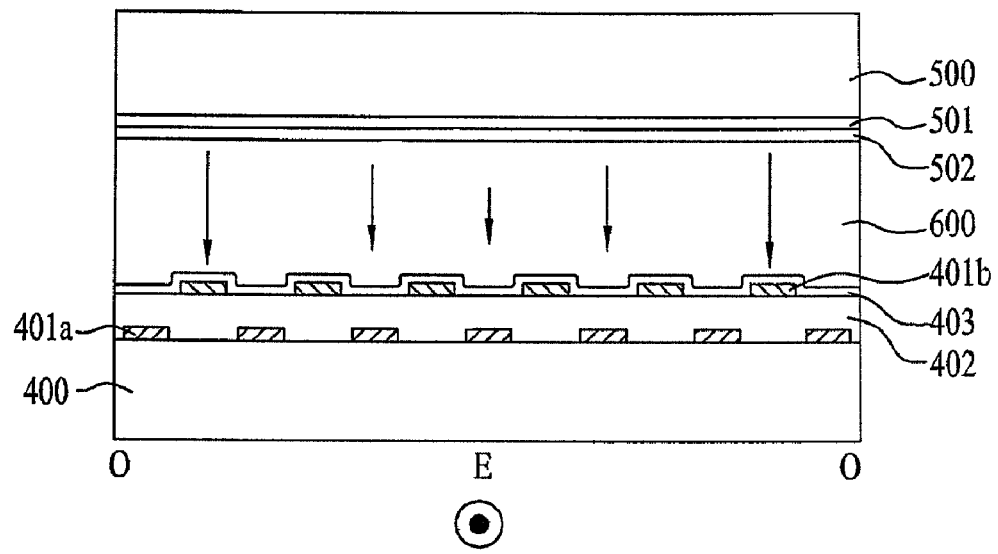
FIG. 9A is a sectional view illustrating an electrically-driven liquid crystal lens according to a third embodiment.
Figure 9B:
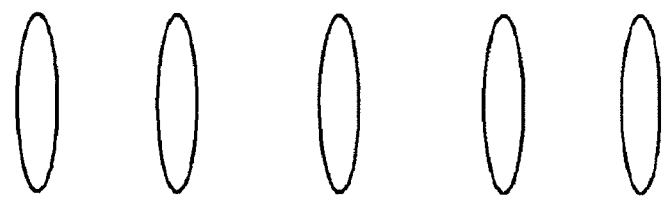
FIGS. 9B and 9C are views illustrating alignment shape of liquid crystals on a per distance basis in one lens region before and after application of voltages in the configuration of FIG. 9A.
Figure 9C:
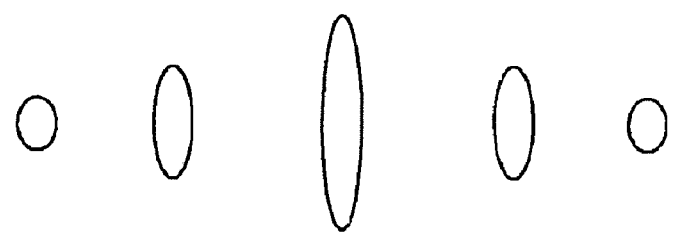

FIG. 9A is a sectional view illustrating an electrically-driven liquid crystal lens according to a third embodiment, and FIGS. 9B and 9C are views illustrating alignment shape of liquid crystals on a per distance basis in one lens region before and after application of voltages in the configuration of FIG. 9A.

As shown in FIG. 9A, in the electrically-driven liquid crystal lens according to a third embodiment of the present invention, the first and second alignment films 403 and 502 are aligned in the longitudinal direction of the first electrodes 401*a* and 401*b* on the first substrate 400 (in a direction into the drawing). In this case, the liquid crystals of the liquid crystal layer 600 have negative dielectric constant anisotropy. Each of the first and second alignment films 403 and 502 is a vertical alignment film having a tilt angle of more than about 89°, and the alignment direction thereof is defined by rubbing. The first and second alignment films 403 and 502 are subjected to rubbing in an anti-parallel direction to each other, on the basis of the longitudinal direction of the first electrodes 401*a* and 401*b*. The vertical alignment film has an alignment angle close to 90° without separate rubbing treatment, and the alignment direction is defined by the slight tilt angle (less than 1°).

As shown in FIG. 9B, before application of voltages, the liquid crystals are upright, according to the alignment angle of the first alignment film 403 close to 90°. After application of voltages, as shown in FIG. 9C, the liquid crystals are driven by a vertical electric field between the first electrodes 401a and 401b and the second electrode 501. Specifically, the liquid crystals are driven perpendicular to the vertical electric field based on the negative dielectric constant anisotropy, and the liquid crystals are horizontally oriented at the center O of the lens region L to which the strongest vertical electric field is applied, and are substantially upright in an initial alignment direction at the edge E of the lens region L. That is, the intensity of the vertical electric field gradually decreases from the center O to the edge E, allowing the liquid crystals, aligned perpendicular to the electric field, to become increasingly upright according to a decrease in the intensity of the vertical electric field. In FIG. 9A, the size of arrows represents the intensity of the vertical electric field. As shown, the center O represents the strongest vertical electric field, and the intensity of the vertical electric field decreases toward the edge E.

At the center O to which the strongest vertical electric field is applied, the liquid crystals are horizontally aligned in the longitudinal direction of the first electrodes 401a and 401b as the first and second alignment films 403 and 502 tilt the liquid crystals to the longitudinal direction so as to define a rotating direction of the liquid crystals upon application of voltages.

Figure 10A:
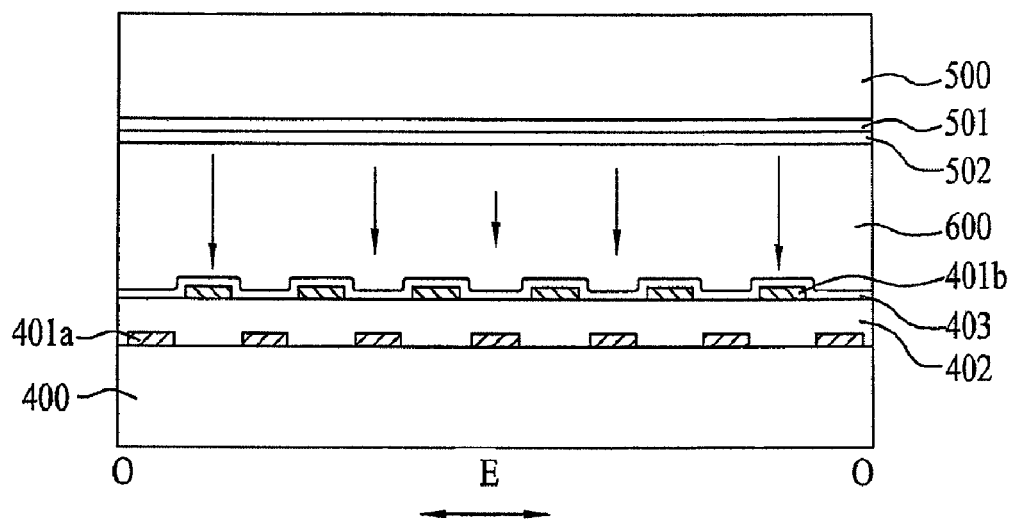
FIG. 10A is a sectional view illustrating an electrically-driven liquid crystal lens according to a fourth embodiment.
Figure 10B:
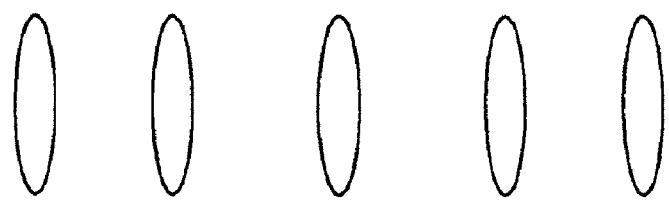
FIGS. 10B and 10C are views illustrating alignment shape of liquid crystals on a per distance basis in one lens region before and after application of voltages in the configuration of FIG. 10A.
Figure 10C:
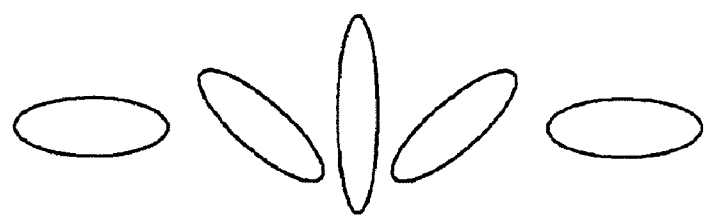

FIG. 10A is a sectional view illustrating an electrically-driven liquid crystal lens according to a fourth embodiment, and FIGS. 10B and 10C are views illustrating alignment shape of liquid crystals on a per distance basis in one lens region before and after application of voltages in the configuration of FIG. 10A.

As shown in FIG. 10A, in the electrically-driven liquid crystal lens according to a fourth embodiment of the present invention, the first and second alignment films 403 and 502 are aligned perpendicular to the longitudinal direction of the first electrodes 401a and 401b on the first substrate 400 (in a horizontal direction in the drawing). In this case, the liquid crystals of the liquid crystal layer 600 have negative dielectric constant anisotropy. Each of the first and second alignment films 403 and 502 is a vertical alignment film having a tilt angle of more than about 89°, and the first and second alignment films 403 and 502 are subjected to rubbing in an anti-parallel direction to each other with respect to the longitudinal direction of the first electrodes 401a and 401b. The vertical alignment film has an alignment angle close to 90° without separate rubbing treatment, and the alignment direction is defined by the slight tilt angle (less than 1°).

As shown in FIG. 10B, before application of voltages, the liquid crystals are upright, according to the alignment angle of the first alignment film 403 close to 90°. After application of voltages, as shown in FIG. 10C, the liquid crystals are driven by a vertical electric field between the first electrodes 401a and 401b and the second electrode 501. Specifically, the liquid crystals are driven perpendicular to the vertical electric field based on the negative dielectric constant anisotropy, whereby the liquid crystals are horizontally aligned at the center O of the lens region L to which the strongest vertical electric field is applied, and are substantially upright in an initial alignment direction at the edge E of the lens region L. That is, the intensity of the vertical electric field gradually decreases from the center O to the edge E, allowing the liquid crystals, aligned perpendicular to the electric field, to become increasingly upright according to a decrease in the intensity of the vertical electric field. In FIG. 10A, the size of arrows represents the intensity of the vertical electric field. As shown, the center O represents the strongest vertical electric field, and the intensity of the vertical electric field decreases toward the edge E.

At the center O to which the strongest vertical electric field is applied, the liquid crystals are horizontally aligned in a direction perpendicular to the longitudinal direction of the first electrodes 401a and 401b (in the horizontal direction in the drawing) as the first and second alignment films 403 and 502 tilt the liquid crystals to the direction so as to define a rotating direction of the liquid crystals upon application of voltages.

Hereinafter, simulations for the configurations of the respective embodiments upon application of voltages will be described.

Figure 11:
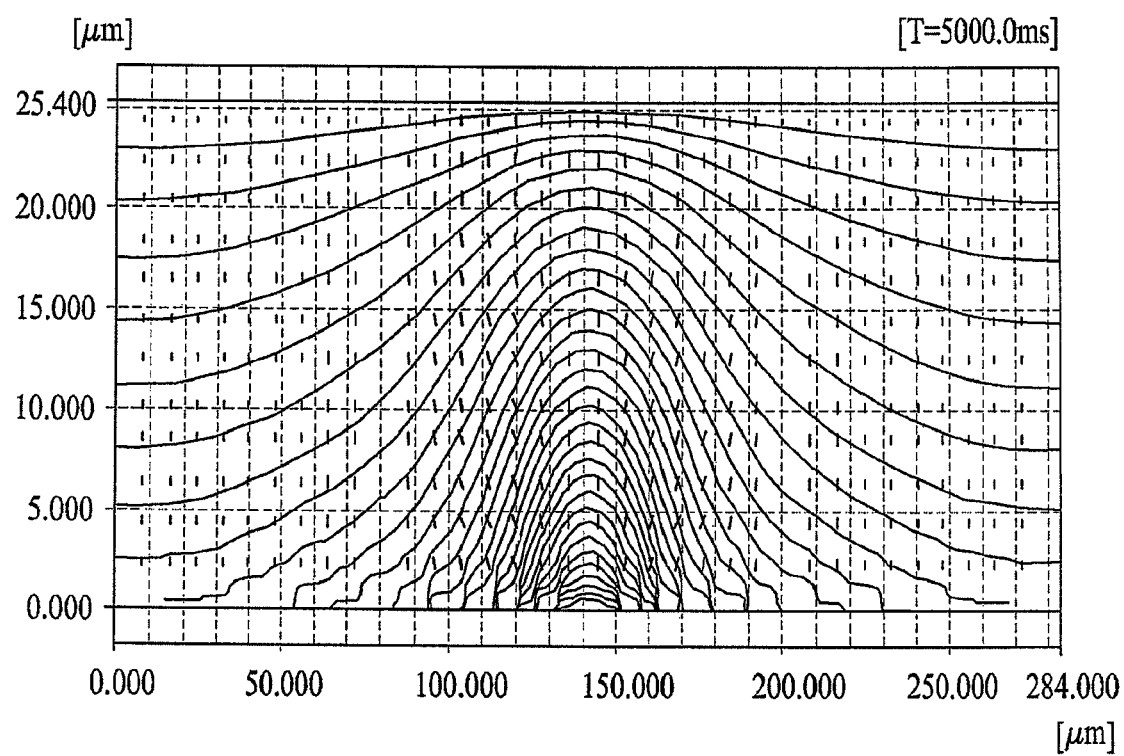
FIG. 11 is a simulation diagram illustrating electric field on a per distance basis of the electrically-driven liquid crystal lens according to the first embodiment.
Figure 12:
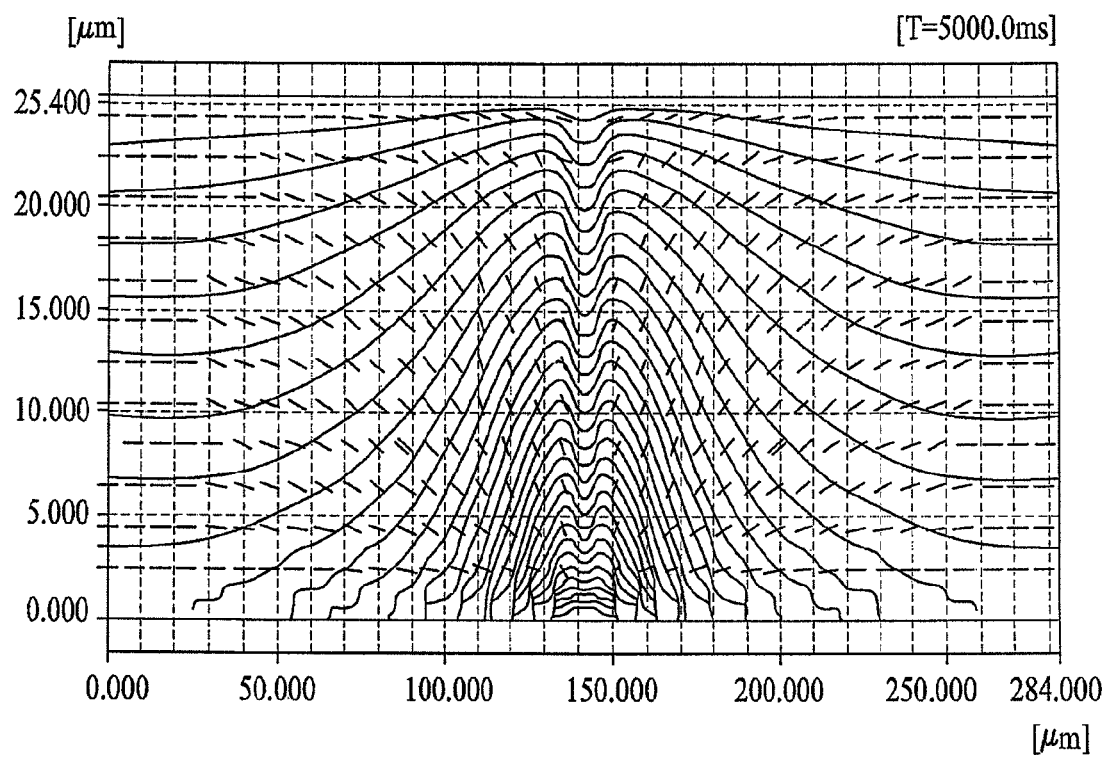
FIG. 12 is a simulation diagram illustrating electric field on a per distance basis of the electrically-driven liquid crystal lens according to the second embodiment.

FIG. 11 is a simulation diagram illustrating electric field on a per distance basis of the electrically-driven liquid crystal lens according to the first embodiment, and FIG. 12 is a simulation diagram illustrating electric field on a per distance basis of the electrically-driven liquid crystal lens according to the second embodiment.

In the embodiments shown in FIGS. 11 and 12, it is assumed that the edge E of the lens region L represents the strongest vertical electric field and the center O represents the weakest vertical electric field and that liquid crystals have the same positive dielectric constant anisotropy and horizontal alignment films are used. A difference between the two embodiments is whether or not an alignment direction is consistent with the longitudinal direction of the first electrodes.

It can be appreciated from FIGS. 11 and 12 in simulation diagrams corresponding to FIGS. 7A and 8A that, upon application of voltages, liquid crystals at the edge are upright by a strong vertical electric field, and liquid crystals at the center O are aligned similar to an initial alignment state by a slight vertical electric field.

Figure 13:
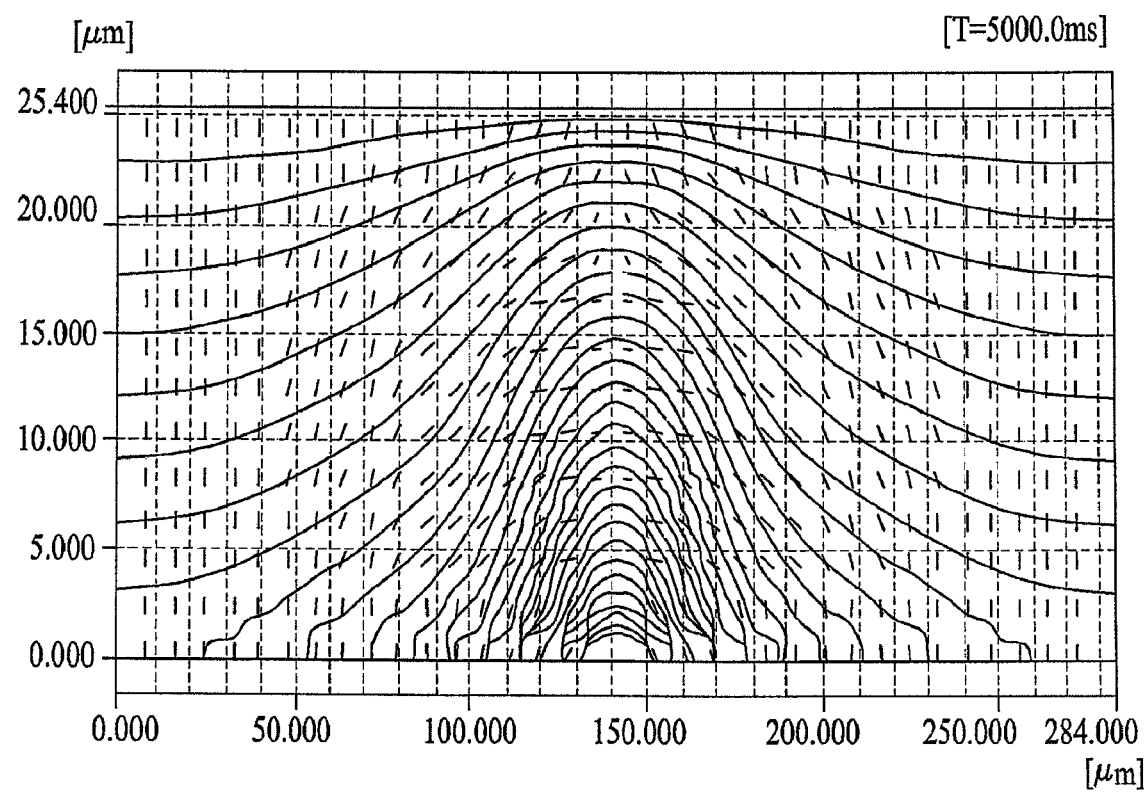
FIG. 13 is a simulation diagram illustrating electric field on a per distance basis of the electrically-driven liquid crystal lens according to the third embodiment.
Figure 14:
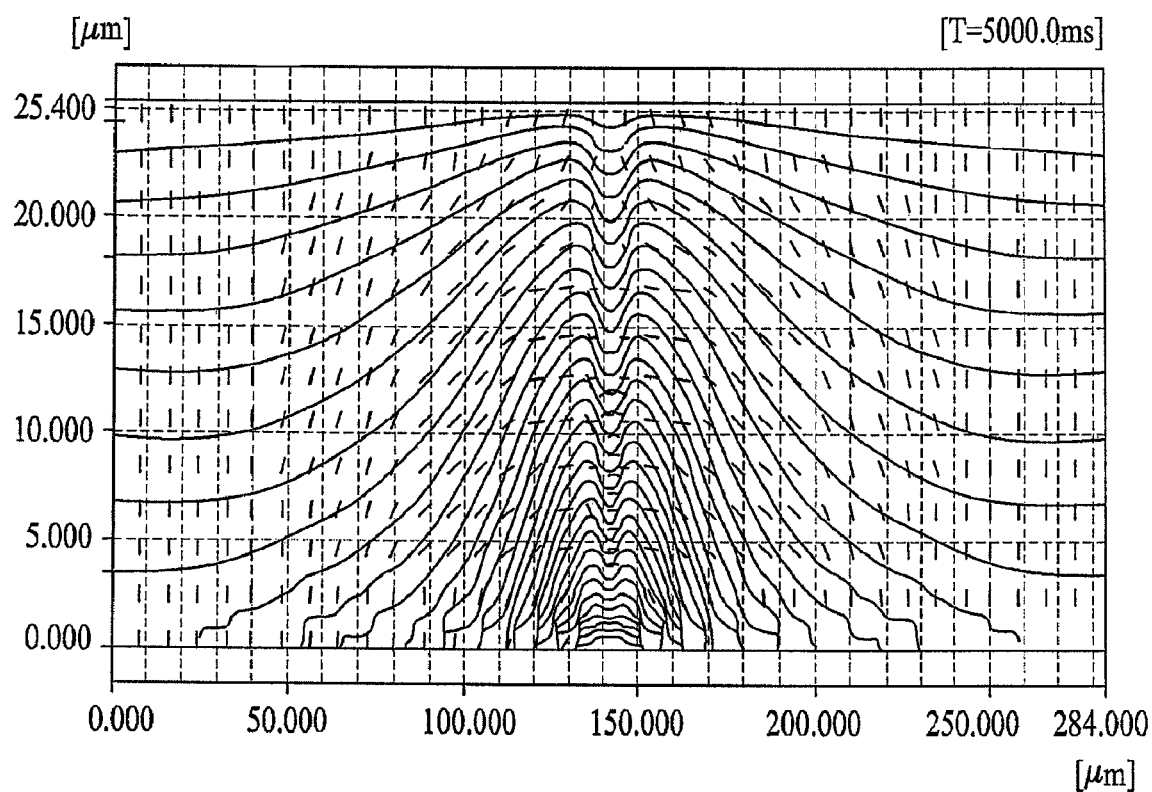
FIG. 14 is a simulation diagram illustrating electric field on a per distance basis of the electrically-driven liquid crystal lens according to the fourth embodiment.

FIG. 13 is a simulation diagram illustrating electric field on a per distance basis of the electrically-driven liquid crystal lens according to the third embodiment, and FIG. 14 is a simulation diagram illustrating electric field on a per distance basis of the electrically-driven liquid crystal lens according to the fourth embodiment.

In the embodiments shown in FIGS. 13 and 14, it is assumed that the edge E of the lens region L represents the strongest vertical electric field and the center O represents the weakest vertical electric field and that liquid crystals have the same negative dielectric constant anisotropy and vertical alignment films are used. A difference between the two embodiments is whether or not an alignment direction is consistent with the longitudinal direction of the first electrodes.

In FIGS. 13 and 14 in simulation diagrams corresponding to FIGS. 9A and 10A, the center of each drawing represents the center O in which a strong vertical electric field is generated upon application of voltages, and either left or right side of the drawing represents the edge E in which a slight vertical electric field is generated. In these embodiments, upon application of voltages, liquid crystals are horizontally aligned at the center O by the strongest vertical electric field and are upright at the edge E by the slight vertical electric field. Here, the horizontal alignment of the liquid crystals is consistent with the alignment direction of the alignment films.

In the above-described electrically-driven liquid crystal lens according to the present invention, the reason why the first and second alignment films are aligned parallel to or perpendicular to the longitudinal direction of the first electrodes is to prevent the liquid crystals from being unintentionally rotated rather than being vertically or horizontally aligned, thereby eliminating a difference in optical pathways defining the lens regions due to unwanted double refraction.

Also, the reason why the plurality of split first electrodes is provided in the lens region is to limit a difference in voltages applied to the neighboring first electrodes to less than 1V, thereby preventing an excessive horizontal electric field from being generated between the first electrodes located on the same substrate. More specifically, when voltages applied to the first electrodes gradually increase (when using liquid crystals having negative dielectric constant anisotropy) or gradually decrease (when using liquid crystals having positive dielectric constant anisotropy) from the edge to the center of the lens region, a horizontal electric field less than a threshold voltage is generated between the first electrodes. As a result, even if the liquid crystals are aligned, based on an ECB mode, parallel to the first electrodes, only mere rotation of liquid crystals having no effect on visual sensitivity occurs.

If the defined alignment direction of the first and second alignment films is oblique to the first electrodes, and if the alignment of liquid crystals is changed to be vertically or horizontally aligned upon application of voltages, the liquid crystals are rotated causing unwanted double refraction. This results in distortion in lens profile.

The present invention is designed to minimize distortion in lens profile, and has a feature of defining an alignment direction of liquid crystals parallel to or perpendicular to the longitudinal direction of first electrodes.

In the electrically-driven liquid crystal lens of the present invention, a black matrix layer may be formed at regions exhibiting rotation of liquid crystals and serve to shield the regions having a probability of crosstalk, i.e. having a high probability of distortion in stereoscopic display from light, thereby eliminating negative effects on visual sensitivity.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, an electrically-driven liquid crystal lens and a stereoscopic display device using the same according to the present invention have the following effects.

Firstly, according to the present invention, the electrically-driven liquid crystal lens includes first and second substrates arranged opposite each other, each having a plurality of lens regions, a plurality of first electrodes formed on the first substrate in the respective lens regions, and a second electrode formed over the entire surface of the second substrate. Different voltages are applied to the first electrodes of the lens regions on a per position basis, and a ground voltage is applied to the second electrode, generating a vertical electric field having a difference in intensity on a per lens region basis. As the electric field drives a liquid crystal layer between the first and second substrates, the electrically-driven liquid crystal lens having the same optical effect as a general lens can be accomplished. The electrically-driven liquid crystal lens according to the present invention can solve problems of a difficulty in uniform processing of the respective lens regions.

Secondly, with relation to an alignment direction of alignment films formed on the first and second substrates, according to the present invention, it is defined to the longitudinal direction of the first electrodes or to be perpendicular to the longitudinal direction. This has the effect of preventing unwanted rotation of liquid crystals.

Thirdly, according to the present invention, each lens region is provided with the plurality of first electrodes, and voltages applied to the first electrodes gradually increase from the edge to the center of the lens region. This eliminates a risk of excessive voltage difference between the neighboring first electrodes, thereby preventing distortion of liquid crystals due to a horizontal electric field between the first electrodes and controlling alignment of liquid crystals based on an initial alignment thereof.

What is claimed is:

1. An electrically-driven liquid crystal lens comprising:
   first and second substrates arranged opposite each other and each including a plurality of lens regions;
   a plurality of first electrodes formed on the first substrate to correspond to the respective lens regions while being spaced apart from one another, to which voltages gradually increasing from the center to the edge of each lens region are applied;
   a second electrode formed over the entire surface of the second substrate;
   a first alignment film formed over the entire surface of the first substrate including the first electrodes and having an alignment direction parallel to or perpendicular to a longitudinal direction of the first electrodes;
   a second alignment film formed on the second electrode and having an anti-parallel alignment direction relative to the first alignment film; and
   a liquid crystal layer filled between the first substrate and the second substrate.

2. The lens according to claim 1, wherein the first and second alignment films are horizontal alignment films having a tilt angle of less than about 1°.

3. The lens according to claim 2, wherein liquid crystals of the liquid crystal layer have positive dielectric constant anisotropy.

4. The lens according to claim 3, wherein the first alignment film is subjected to rubbing parallel to the first electrodes.

5. The lens according to claim 3, wherein the first alignment film is subjected to rubbing perpendicular to the first electrodes.

6. The lens according to claim 1, wherein the first and second alignment films are vertical alignment films having a tilt angle of more than about 89°.

7. The lens according to claim 6, wherein liquid crystals of the liquid crystal layer have negative dielectric constant anisotropy.

8. The lens according to claim 7, wherein the first alignment film is subjected to rubbing parallel to the first electrodes.

9. The lens according to claim 7, wherein the first alignment film is subjected to rubbing perpendicular to the first electrodes.

10. The lens according to claim 1, wherein the first electrodes have an elongated form extending in a given direction on the first substrate.

11. The lens according to claim 1, wherein a difference in voltages applied to the neighboring first electrodes is less than about 1V.

12. A stereoscopic display device comprising:
    a display panel to emit 2-dimensional image signals; and
    an electrically-driven liquid crystal lens to directly emit the 2-dimensional image signals from the display panel, or to convert the 2-dimensional image signals into 3-dimensional image signals so as to emit the 3-dimensional image signals, wherein the electrically-driven liquid crystal lens includes:

first and second substrates arranged opposite each other and each including a plurality of lens regions;

a plurality of first electrodes formed on the first substrate to correspond to the respective lens regions while being spaced apart from one another, to which voltages gradually increasing from the center to the edge of each lens region are applied;

a second electrode formed over the entire surface of the second substrate;

a first alignment film formed over the entire surface of the first substrate including the first electrodes and having an alignment direction parallel to or perpendicular to a longitudinal direction of the first electrodes;

a second alignment film formed on the second electrode and having an anti-parallel alignment direction relative to the first alignment film; and a liquid crystal layer filled between the first substrate and the second substrate.

13. The device according to claim 12, wherein, when polarized light is transmitted from the display panel to the electrically-driven liquid crystal lens, a transmission axis of the polarized light is consistent with the alignment direction of the first alignment film.

* * * * *